United States Patent
Cedoz et al.

(10) Patent No.: US 10,378,439 B2
(45) Date of Patent: Aug. 13, 2019

(54) GAS TURBINE ENGINE WITH VARIABLE SPEED TURBINES

(71) Applicant: ROLLS-ROYCE NORTH AMERICAN TECHNOLOGIES, INC., Indianapolis, IN (US)

(72) Inventors: Robert W. Cedoz, Indianapolis, IN (US); Syed J. Khalid, Palm Beach Gardens, FL (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 0 days.

(21) Appl. No.: 14/367,452

(22) PCT Filed: Dec. 28, 2012

(86) PCT No.: PCT/US2012/072123
§ 371 (c)(1),
(2) Date: Jun. 20, 2014

(87) PCT Pub. No.: WO2013/102113
PCT Pub. Date: Jul. 4, 2013

(65) Prior Publication Data
US 2015/0330301 A1    Nov. 19, 2015

Related U.S. Application Data

(60) Provisional application No. 61/581,868, filed on Dec. 30, 2011.

(51) Int. Cl.
*F02C 3/10* (2006.01)
*F02C 3/13* (2006.01)
(Continued)

(52) U.S. Cl.
CPC .............. *F02C 3/10* (2013.01); *F02C 3/13* (2013.01); *F02C 7/36* (2013.01); *F02C 9/18* (2013.01);
(Continued)

(58) Field of Classification Search
CPC ....... F05D 2207/023; F05D 2260/4023; F02C 7/36; F02C 9/18; F02C 3/13; F16K 3/08; F16K 3/085
See application file for complete search history.

(56) References Cited

U.S. PATENT DOCUMENTS 2,622,392 A    12/1952  Boestad et al.
2,650,666 A *   9/1953  Dorand .................. B64C 27/18
                                              244/17.11
(Continued)

FOREIGN PATENT DOCUMENTS

EP       1978222 A2   10/2008
WO   2007/081817 A2    7/2007
(Continued)

OTHER PUBLICATIONS

PCT International Search Report and Written Opinion completed by the ISA/US dated Feb. 14, 2013 and issued in connection with PCT/US2012/072123.
(Continued)

*Primary Examiner* — Gerald L Sung
*Assistant Examiner* — William L Breazeal
(74) *Attorney, Agent, or Firm* — Barnes & Thornburg LLP

(57) ABSTRACT

Embodiments of the present invention include unique gas turbine engines. Other embodiments include apparatuses, systems, devices, hardware, methods, and combinations for gas turbine engines. Further embodiments, forms, features, aspects, benefits, and advantages of the present application
(Continued)

will become apparent from the description and figures provided herewith.

13 Claims, 3 Drawing Sheets

(51) Int. Cl.
 *F02C 7/36* (2006.01)
 *F02C 9/18* (2006.01)
(52) U.S. Cl.
 CPC ............. *F05D 2260/4023* (2013.01); *F05D 2270/023* (2013.01); *F05D 2270/06* (2013.01)

(56) References Cited

U.S. PATENT DOCUMENTS

| | | | |
|---|---|---|---|
| 3,363,415 A * | 1/1968 | Williams | B60K 3/04 165/7 |
| 3,472,487 A * | 10/1969 | Moellmann | F01D 17/06 415/144 |
| 3,585,795 A * | 6/1971 | Grieb | F02C 3/36 60/39.11 |
| 3,609,967 A * | 10/1971 | Waldmann | F02C 6/006 60/39.183 |
| 3,841,091 A | 10/1974 | Sargisson et al. | |
| 3,938,328 A | 2/1976 | Klees | |
| 4,050,560 A * | 9/1977 | Torstenfelt | F02C 7/36 192/103 F |
| 4,060,981 A | 12/1977 | Hampton | |
| 4,064,692 A | 12/1977 | Johnson et al. | |
| 4,222,235 A | 9/1980 | Adamson et al. | |
| 4,845,944 A | 7/1989 | Rodgers | |
| 5,129,225 A | 7/1992 | Tonks | |
| 5,136,840 A | 8/1992 | Nash | |
| 5,485,717 A * | 1/1996 | Williams | F02C 9/18 60/226.1 |
| 5,623,823 A | 4/1997 | Schirle et al. | |
| 5,775,092 A | 7/1998 | Hines | |
| 6,968,701 B2 | 11/2005 | Glahn et al. | |
| 7,762,085 B2 | 7/2010 | Exley et al. | |
| 2002/0122723 A1 | 9/2002 | Care et al. | |
| 2004/0240988 A1 | 12/2004 | Franconi et al. | |
| 2008/0141649 A1 | 6/2008 | Petrowicz et al. | |
| 2009/0293449 A1 * | 12/2009 | Venter | F02C 9/18 60/226.1 |
| 2009/0320491 A1 | 12/2009 | Copeland | |
| 2011/0265650 A1 | 11/2011 | Kazlauskas et al. | |
| 2013/0251512 A1 * | 9/2013 | Lombard | F02B 37/183 415/125 |

FOREIGN PATENT DOCUMENTS

| | | |
|---|---|---|
| WO | 2011/039263 A1 | 4/2011 |
| WO | 2011/162845 A1 | 12/2011 |

OTHER PUBLICATIONS

International Preliminary Report on Patentability, International Application No. PCT/US2012/072123, dated May 12, 2015, 9 pages.

* cited by examiner

GAS TURBINE ENGINE WITH VARIABLE SPEED TURBINES

CROSS REFERENCE TO RELATED APPLICATIONS

This application is a U.S. national counterpart application of international application serial No. PCT/US2012/072123 filed Dec. 28, 2012, which claims priority under 35 USC § 119(e) to U.S. Provisional Patent Application No. 61/581,868 filed Dec. 30, 2011, the entire disclosures of which are incorporated herein by reference.

FIELD OF THE INVENTION

The present invention relates to gas turbine engines, and more particularly, to gas turbine engines with variable speed turbines.

BACKGROUND

Gas turbine engines that effectively vary the speed of one or more turbines remain an area of interest. Some existing systems have various shortcomings, drawbacks, and disadvantages relative to certain applications. Accordingly, there remains a need for further contributions in this area of technology.

SUMMARY

Embodiments of the present invention include unique gas turbine engines. Other embodiments include apparatuses, systems, devices, hardware, methods, and combinations for gas turbine engines. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
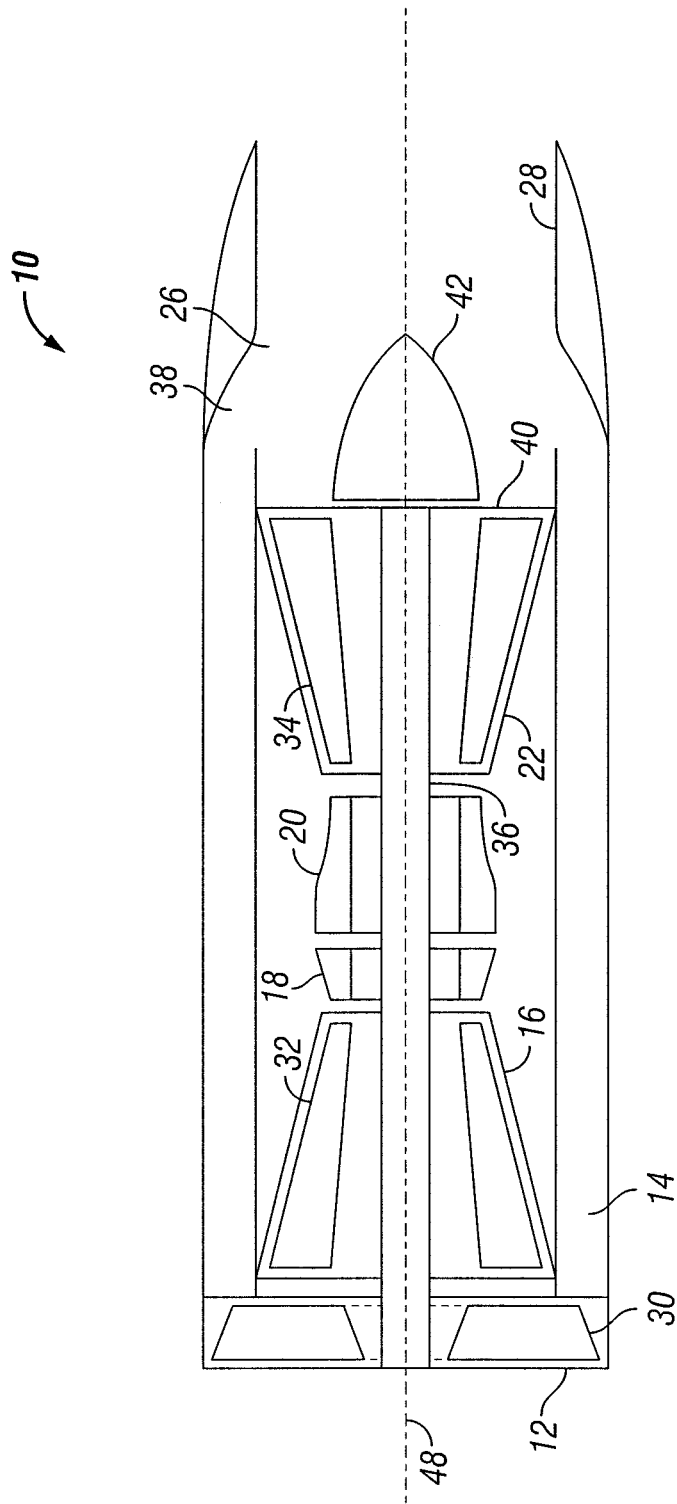
FIG. 1 schematically illustrates some aspects of a non-limiting example of a gas turbine engine in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to the drawings, and in particular FIG. 1, some aspects of a non-limiting example of a gas turbine engine 10 in accordance with an embodiment of the present invention are schematically depicted. In one form, gas turbine engine 10 is an aircraft propulsion power plant. In other embodiments, gas turbine engine 10 may be a land-based or marine engine. In one form, gas turbine engine 10 is a multi-spool turbofan engine. In other embodiments, gas turbine engine 10 may take other forms, and may be, for example, a turboshaft engine, a turbojet engine, a turboprop engine, or a combined cycle engine having a single spool or multiple spools.

As a turbofan engine, gas turbine engine 10 includes a fan system 12, a bypass duct 14, a compressor section 16, a diffuser 18, a combustor 20, a turbine section 22, a discharge duct 26 and an exhaust nozzle system 28. Bypass duct 14 and compressor section 16 are in fluid communication with fan system 12. Diffuser 18 is in fluid communication with compressor section 16. In some embodiments, compressor section 16 may include a high pressure compressor and a low pressure compressor, each of which may have one or more stages (not shown). In other embodiments, compressor section 16 may include a high pressure compressor, an intermediate pressure compressor and a low pressure compressor, each of which may have one or more stages (not shown). In still other embodiments, compressor section 16 may be a single compressor, which may have one or more stages. Combustor 20 is fluidly disposed between compressor section 16 and turbine section 22.

In one form, combustor 20 includes a combustion liner (not shown) that contains a continuous combustion process. In other embodiments, combustor 20 may take other forms, and may be, for example and without limitation, a pressure gain combustion system, or a slinger combustion system, and may employ deflagration and/or detonation combustion processes. In some embodiments, turbine section 22 may include a high pressure turbine and a low pressure turbine, each of which may have one or more stages (not shown). In other embodiments, turbine section 22 may include a high pressure turbine, an intermediate pressure turbine and a low pressure turbine, each of which may have one or more stages (not shown). In still other embodiments, turbine section 22 may be a single turbine, which may have one or more stages.

Fan system 12 includes a fan rotor system 30. In various embodiments, fan rotor system 30 includes one or more rotors (not shown) that are powered by turbine section 22. Bypass duct 14 is operative to transmit a bypass flow generated by fan system 12 to nozzle 28. Compressor section 16 includes a compressor rotor system 32. In various embodiments, compressor rotor system 32 includes one or more rotors (not shown) that are powered or driven by turbine section 22. Each compressor rotor includes a plurality of rows of compressor blades (not shown) that are alternately interspersed with rows of compressor vanes (not shown). Turbine section 22 includes a turbine rotor system 34. In various embodiments, turbine rotor system 34 includes one or more rotors (not shown) operative to separately (or jointly in some embodiments) drive one or more rotors of fan rotor system 30 and one or more rotors of compressor rotor system 32. Each turbine rotor includes one or more rows of turbine blades (not shown), which are alternatingly interspersed with rows of turbine vanes (not shown).

Turbine rotor system 34 is drivingly coupled to compressor rotor system 32 and fan rotor system 30 via a shafting system 36. In various embodiments, shafting system 36 includes a plurality of shafts that may rotate at the same and/or different speeds, and which may rotate in the same and/or different directions. In some embodiments, only a single shaft may be employed. Turbine section 22 is operative to discharge an engine 10 core flow to nozzle 28. In one form, fan rotor system 30, compressor rotor system 32, turbine rotor system 34 and shafting system 36 rotate about an engine centerline 48. In other embodiments, all or parts of fan rotor system 30, compressor rotor system 32, turbine rotor system 34 and shafting system 36 may rotate about one or more other axes of rotation in addition to or in place of engine centerline 48.

Discharge duct 26 extends between a discharge portion 40 of turbine section 22 and engine nozzle 28. Discharge duct 26 is operative to direct bypass flow and core flow from a bypass duct discharge portion 38 and turbine discharge portion 40, respectively, into nozzle system 28. In some embodiments, discharge duct 26 may be considered a part of nozzle 28. Nozzle 28 is in fluid communication with fan system 12 and turbine section 22. Nozzle 28 is operative to receive the bypass flow from fan system 12 via bypass duct 14, and to receive the core flow from turbine section 22, and to discharge both as an engine exhaust flow, e.g., a thrust-producing flow. In other embodiments, other nozzle arrangements may be employed, including separate nozzles for each of the core flow and the bypass flow.

During the operation of gas turbine engine 10, air is drawn into the inlet of fan 12 and pressurized by fan 12. In one form, some of the air pressurized by fan 12 is directed into compressor section 16 as core flow, and some of the pressurized air is directed into bypass duct 14 as bypass flow, and is discharged into nozzle 28 via discharge duct 26. In other embodiments, other flow arrangements may be utilized. Compressor section 16 further pressurizes the portion of the air received therein from fan 12, which is then discharged into diffuser 18. Diffuser 18 reduces the velocity of the pressurized air, and directs the diffused core airflow into combustor 20. Fuel is mixed with the pressurized air in combustor 20, which is then combusted. The hot gases exiting combustor 20 are directed into turbine section 22, which extracts energy in the form of mechanical shaft power sufficient to drive fan system 12 and compressor section 16 via shafting system 36. The core flow exiting turbine section 22 is directed along an engine tail cone 42 and into discharge duct 26, along with the bypass flow from bypass duct 14. Discharge duct 26 is configured to receive the bypass flow and the core flow, and to discharge both as an engine exhaust flow, e.g., for providing thrust, such as for aircraft propulsion.

Figure 2:
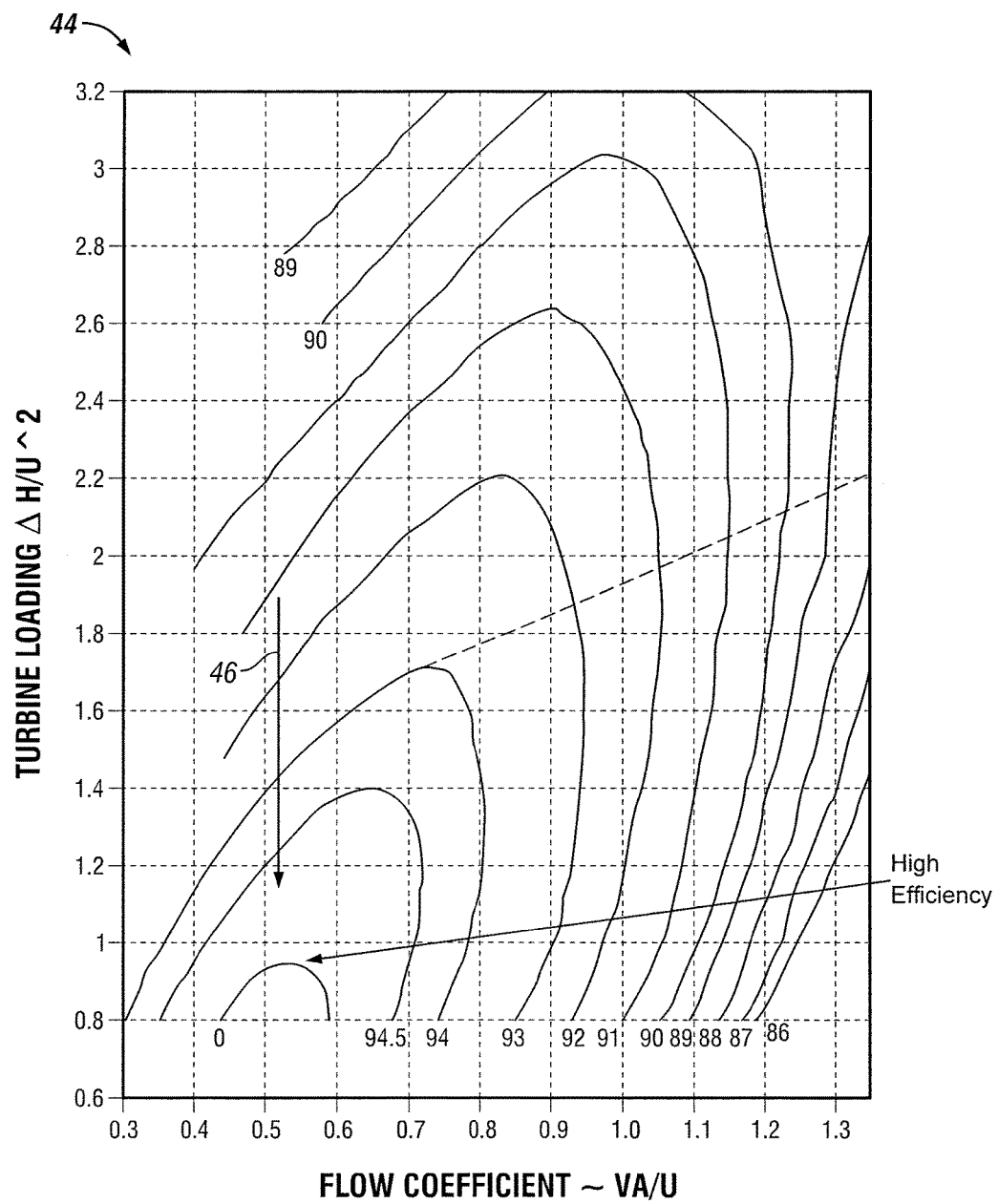
FIG. 2 is non-limiting example of a plot depicting turbine efficiency against turbine loading and flow coefficient.
Figure 3:
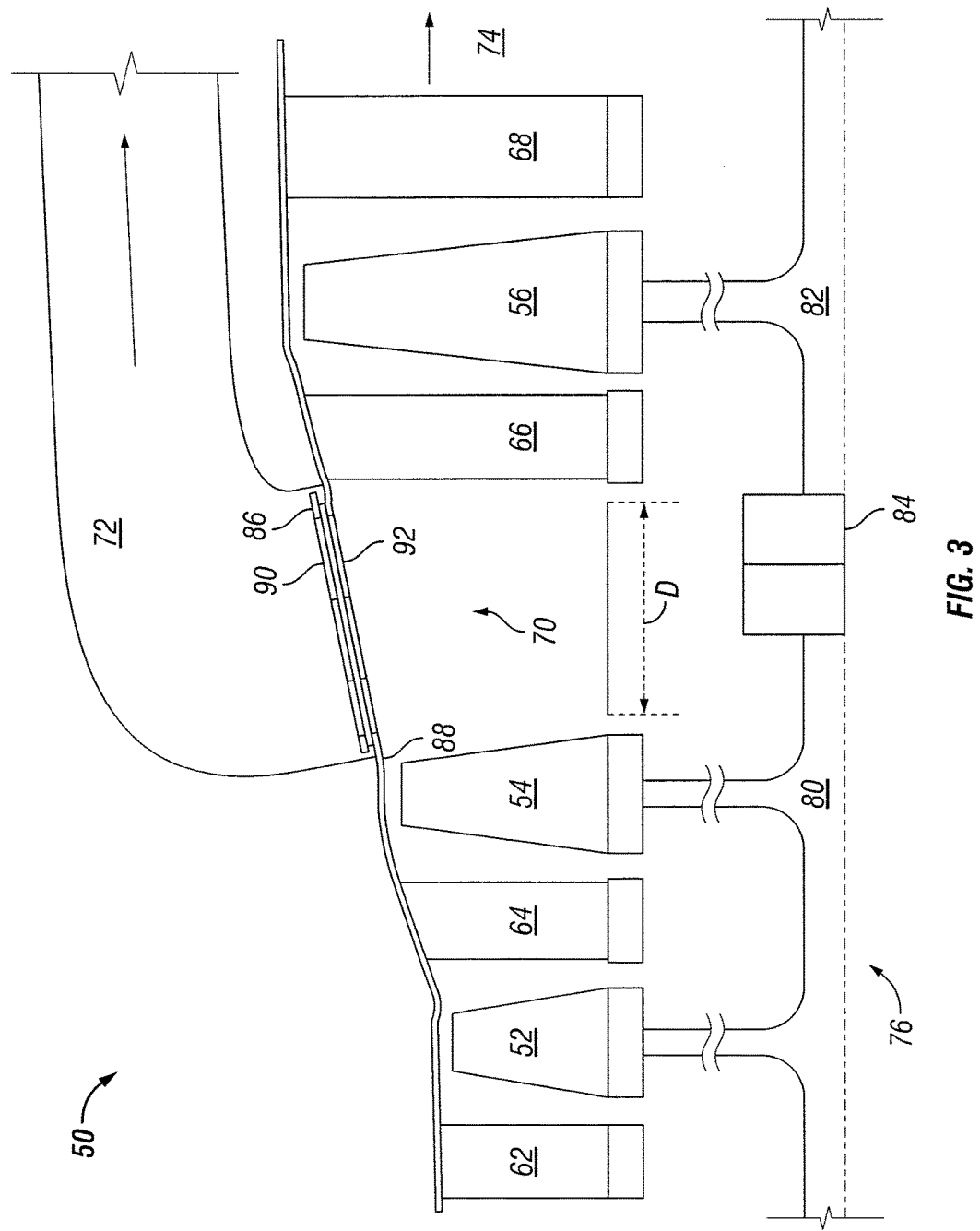
FIG. 3 schematically illustrates some aspects of a non-limiting example of a portion of a turbine section and shafting system in accordance with an embodiment of the present invention.

In certain applications, it is desirable to operate a turbine, for example and without limitation, a low pressure turbine or power turbine, at more than one speed, e.g., depending upon the engine 10 operating condition, with the power output or turbine enthalpy extraction remaining at either maximum power rating or at apart power rating. Although this may be accomplished by using gearing, e.g., reduction gearing, gearing can be heavy. The inventors have determined that a valve between two turbine stages may be employed to accomplish the same or a similar goal (for example and without limitation, an embodiment of which is schematically illustrated in FIG. 3 and subsequently described). For higher speed operation, the valve is opened to a desired degree, permitting the gases exiting the higher pressure stage(s) to exit the engine and bypass the lower pressure stage(s), hence reducing the amount of energy delivered to the lower pressure stage(s) or not energizing the lower pressure stage(s). This increases the expansion ratio across the higher pressure stage(s), resulting in an increased rotational speed of the higher pressure stage(s). With increased speed, the higher pressure stage(s) may operate more optimally, as illustrated in FIG. 2. FIG. 2 illustrates a plot 44 of turbine efficiency against turbine loading, $\Delta H/U^2$, and flow coefficient, VA/U, where H is enthalpy, U is a blade loading coefficient, V is gas velocity, and A is turbine flow area. Since delta enthalpy is the same, the turbine loading, $\Delta H/U^2$, becomes lower, with the efficiency of the high pressure stage(s) becoming more favorable to maintain the higher speed, as indicated by arrow 46, which shows increasing efficiency at constant flow coefficient with decreasing turbine loading. Arrow 46 also reflects the direction of power turbine front section operating point migration with increased speed resulting from increased expansion ratio due to bypassing the $2^{nd}$ power turbine section. The expansion ratio across the lower pressure stage(s) becomes closes to unity, consequently producing reduced torque or no torque. In some embodiments, a clutch is included, disposed between the higher pressure stage(s) and the lower pressure stage(s), and is operative to allow the lower pressure stage(s) to slow down.

With the valve closed, the exhaust from the higher pressure stage(s) is directed into the lower pressure stage(s), the higher pressure stage(s) operate at a lower speed, and the lower pressure stage(s) produce torque as in a conventional turbine. When the valve closed, the clutch is operative to combine the torque output of the lower pressure stage(s) with the torque of the higher pressure stage(s). In some embodiments, variable geometry turbine vanes (nozzles) may be incorporated to further optimize performance in both operating modes (high and low speed).

Referring to FIG. 3, some aspects of a non-limiting example of a portion 50 of turbine section 22 in accordance with an embodiment of the present invention are schematically illustrated. In one form, portion 50 is a low pressure turbine or power turbine, and will be referred to as turbine 50. Turbine section 22 also includes a high pressure turbine (not shown) upstream of turbine 50. In other embodiments, portion 50 may be an intermediate pressure turbine or a high pressure turbine. In one form, turbine 50 is a three stage turbine, and includes three rotating blade stages 52, 54 and 56, which are first, second and third stage blades, respectively; three vane stages 62, 64 and 66, which are first, second and third stage vanes, respectively; an exhaust guide vane stage 68; a valve 70; a second stage exhaust 72 and a third stage exhaust 74. In various other embodiments, turbine 50 may include only two turbine blade stages, or may include any number of turbine blade stages beyond three. Valve 70 is in fluid communication with second stage exhaust 72. In one form, valve 70 is fluidly disposed between blade stages 54 and 56. In other embodiments, valve 70 may be fluidly disposed between any two turbine stages. In still other embodiments, a plurality of valves 70 may be employed between any two stages in multiple sets of two turbine stages, e.g., between a first stage and a second stage, and between a second stage and a third stage. Second stage exhaust 72 and third stage exhaust 74 are in fluid communication with engine exhaust nozzle 28.

In one form, turbine 50 is coupled to fan rotor 30 via a shafting subsystem 76 of shafting system 36. In other embodiments, turbine 50 may be coupled to a compressor rotor or another power absorber, including and without limitation, a gearbox, a generator or other electrical power producing machine, a pump and/or any other type of machine in addition to or in place of fan rotor 30.

Shafting subsystem 76 includes a shaft 80, a shaft 82 and a clutch 84. Turbine 50 is drivingly coupled to fan rotor 30 via shafting subsystem 76. In some embodiments, turbine 50 may be drivingly coupled to a compressor rotor via shafting subsystem 76, e.g., a low pressure compressor, in addition to or in place of fan rotor 30. In other embodiments, turbine 50 may be drivingly coupled to one or more other load absorbers, e.g., via shafting subsystem 76 or another shafting system, in addition to or in place of fan rotor 30. Shaft 80 is coupled to the load absorber (e.g., fan 30), and is operable to transmit power from rotating turbine blade stages 52 and 54 to the load absorber. Shaft 82 is coupled to shaft 80 via clutch 84, and is operable to transmit power from rotating turbine blade stage 56 to shaft 80, and hence, to the power absorber (e.g., fan rotor 30) via clutch 84 and shaft 80. In one form, clutch 84 is disposed between blade stages 54 and 56. In other embodiments, clutch 84 may be disposed between any two turbine stages. In still other embodiments, a plurality of clutches 84 may be employed between any two stages in multiple sets of two turbine stages, e.g., between a first stage and a second stage, and between a second stage and a third stage.

Clutch 84 is configured to allow rotating turbine blade stages 52 and 54 to rotate at a faster speed than rotating turbine blade stage 56. Clutch 84 is also configured to prevent rotating turbine blade stage 56 from rotating faster than rotating turbine blade stages 52 and 54. In one form, clutch 84 is an overrunning clutch, for example and without limitation, a sprag clutch. In other embodiments, one or more of other types of clutches may be employed in addition to or in place of an overrunning clutch.

Valve 70 is configured to selectively vent the output of the second stage turbine blades 54 to second stage exhaust 72 and into nozzle 28 or to supply the output of second stage turbine blades into the third turbine stage (e.g., vanes 66 and blades 56). In one form, valve 70 is a variable position valve. As a variable position valve, valve 70 may be configured to move or operate, in incremental and/or continuous fashion, between a fully or partially closed position and a fully or partially opened position. In other embodiments, valve 70 may be an on/off valve, i.e., configured to be selectively positioned at either a fully or partially closed position or at a fully or partially opened position. In one form, valve 70 is a rotating sleeve valve. In other embodiments, valve 70 may take other forms, for example and without limitation, louvers that are pivotable to open or close a flow area therebetween. In one form, valve 70 is formed of a rotatable sleeve 86 and a turbine case structure 88. Sleeve 86 includes a plurality of openings 90. Case structure 88 includes a plurality of openings 92. For clarity of illustration, only two each of openings 90 and 92 are shown. However, it will be understood that any number of openings 90 and 92 may be employed, e.g., commensurate with flow requirements. Sleeve 86 is configured to be rotated by an actuation mechanism (not shown) to selectively align and misalign openings 90 and 92 in order to selectively vent the output of turbine blade stage 54 into nozzle 28 via second stage exhaust 72 or supply the output of turbine blade stage 54 into third stage turbine vanes and blades 66 and 56, respectively. It will be understood that the distance "D" between blades 54 and vanes 66 may vary with the needs of the application, and may be, for example, any suitable length that promotes flow exiting blades 54 to turn into valve 70.

By venting the output of turbine blade stage 54 into second stage exhaust 72, thereby bypassing third stage turbine vanes and blades 66 and 56, respectively, the rotational speed of the first and second stages 52 and 54 increases, which increases the efficiency of the first and second stage turbines, as set forth above with respect to FIG. 2. Clutch 84 allows the third stage blades 56 to slow down. The expansion ratio across blades 56 decreases, and the torque output though shaft 82 decreases. When valve 70 is in the closed position, thereby directing the output of turbine blade stage 54 into third stage turbine vanes and blades 66 and 56, respectively, the rotational speed of the first and second stages 52 and 54 decreases, and the rotational speed of blades 56 increases until the speed of shaft 82 reaches the speed of shaft 80, at which point clutch 84 engages. The expansion ratio across blades 56 increases with the gas flow therethrough, hence increasing the torque transmitted through shaft 82 and into shaft 80 via clutch 84.

Embodiments of the present invention include a gas turbine engine, comprising: a fan; a compressor in fluid communication with the fan; a combustor in fluid communication with the compressor; a first turbine in fluid communication with the combustor and operative to drive the compressor; a second turbine in fluid communication with the first turbine and operative to drive the fan, wherein the second turbine includes at least a first stage and a second stage downstream of the first stage; and a clutch configured to allow the first stage to rotate at a faster speed than the second stage.

In a refinement, the gas turbine engine further comprises a valve fluidly disposed between the first stage and the second stage, wherein the valve is configured to vent the output of the first stage.

In another refinement, the valve is configured as a sleeve valve.

In yet another refinement, the valve is configured as a rotating sleeve valve.

In still another refinement, the output of the first stage is vented to an engine exhaust when the valve is in an opened position.

In yet still another refinement, the gas turbine engine is configured to rotate the first stage at a faster speed than the second stage when the valve is in an opened position.

In a further refinement, the gas turbine engine is configured to rotate the first stage at the same speed as the second stage when the valve is closed.

In a yet further refinement, the clutch is configured to prevent the second stage from rotating faster than the first stage.

In a still further refinement, the clutch is an over-running clutch.

Embodiments of the present invention include a gas turbine engine, comprising: a compressor; a combustor in fluid communication with the compressor; a first turbine in fluid communication with the combustor and operative to drive the compressor; a second turbine in fluid communication with the first turbine and operative to drive a load absorber, wherein the second turbine includes at least a first stage and a second stage downstream of the first stage; and a valve fluidly disposed between the first stage and the second stage, wherein the valve is configured to vent the output of the first stage.

In a refinement, the valve is configured as a sleeve valve.

In another refinement, the valve is configured as a rotating sleeve valve.

In yet another refinement, the output of the first stage is vented to an engine exhaust when the valve is opened.

In still another refinement, the gas turbine engine is configured to rotate the first stage at a faster speed than the second stage when the valve is in an opened position.

In yet still another refinement, the gas turbine engine is configured to rotate the first stage at the same speed as the second stage when the valve is closed.

In a further refinement, the gas turbine engine further comprises a clutch configured to allow the first stage to rotate at a faster speed than the second stage.

In a yet further refinement, the clutch is configured to prevent the second stage from rotating faster than the first stage.

In a still further refinement, the clutch is an over-running clutch.

Embodiments of the present invention include a gas turbine engine, comprising: a compressor; a combustor in fluid communication with the compressor; a first turbine in fluid communication with the combustor and operative to drive the compressor; a second turbine in fluid communication with the first turbine and operative to drive a load absorber, wherein the second turbine includes at least a first stage and a second stage downstream of the first stage; and means for selectively increasing the speed of the first stage and decreasing the speed of the second stage or selectively operating both the first stage and the second stage at the same speed during operation of the gas turbine engine.

In a refinement, the means includes a valve fluidly disposed between the first stage and the second stage and operative to selectively vent the output of the first stage, and a clutch configured to allow the first stage to rotate at a faster speed than the second stage.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A gas turbine engine, comprising:
a fan configured to generate and transmit a bypass flow in a bypass duct;
a compressor in fluid communication with the fan;
a combustor in fluid communication with the compressor;
a first turbine in fluid communication with the combustor and operative to drive the compressor;
a second turbine in fluid communication with the first turbine and operative to drive the fan, wherein the second turbine includes at least a first stage and a second stage downstream of the first stage, both the first and second stages operative to drive the fan; and
a clutch configured to allow the first stage to rotate at a faster speed than the second stage,
further comprising a valve fluidly disposed between the first stage and the second stage, wherein the valve is configured to vent an output of the first stage, thereby reducing an amount of gas that is delivered to the second stage and increasing a speed of the first stage,
wherein the valve is configured as a sleeve valve,
wherein the clutch is configured to prevent the second stage from rotating faster than the first stage.

2. The gas turbine engine of claim 1, wherein the valve is configured as a rotating sleeve valve.

3. The gas turbine engine of claim 1, wherein the output of the first stage is vented to an engine exhaust when the valve is in an opened position.

4. The gas turbine engine of claim 1, wherein the gas turbine engine is configured to rotate the first stage at the faster speed than the second stage when the valve is in an opened position.

5. The gas turbine engine of claim 1, wherein the gas turbine engine is configured to rotate the first stage at a same speed as the second stage when the valve is closed.

6. The gas turbine engine of claim 1, wherein the clutch is an over-running clutch.

7. A gas turbine engine, comprising:
a compressor;
a combustor in fluid communication with the compressor;
a first turbine in fluid communication with the combustor and operative to drive the compressor;
a second turbine in fluid communication with the first turbine and operative to drive a load absorber, wherein the second turbine includes at least a first stage and a second stage downstream of the first stage; and
a valve fluidly disposed between the first stage and the second stage, wherein the valve is configured to vent an output of the first stage, thereby reducing an amount of gas that is delivered to the second stage and increasing a speed of the first stage,
wherein the valve is configured as a sleeve valve,
further comprising a clutch configured to allow the first stage to rotate at a faster speed than the second stage,
wherein the clutch is configured to always prevent the second stage from rotating faster than the first stage.

8. The gas turbine engine of claim 7, wherein the valve is configured as a rotating sleeve valve.

9. The gas turbine engine of claim 7, wherein the output of the first stage is vented to an engine exhaust when the valve is in an opened position.

10. The gas turbine engine of claim 7, wherein the gas turbine engine is configured to rotate the first stage at the faster speed than the second stage when the valve is in an opened position.

11. The gas turbine engine of claim 7, wherein the gas turbine engine is configured to rotate the first stage at a same speed as the second stage when the valve is closed.

12. The gas turbine engine of claim 7, wherein the clutch is an over-running clutch.

13. A gas turbine engine, comprising: a compressor;
a combustor in fluid communication with the compressor;
a first turbine in fluid communication with the combustor and operative to drive the compressor;
a second turbine in fluid communication with the first turbine and operative to drive a load absorber, wherein the second turbine includes at least a first stage and a second stage downstream of the first stage, both the first and second stages operative to drive the load absorber; and
means for selectively increasing a speed of the first stage and decreasing a speed of the second stage or selectively operating both the first stage and the second stage at a same speed during operation of the gas turbine engine;

wherein the means includes a sleeve valve fluidly disposed between the first stage and the second stage and operative to selectively vent an output of the first stage, thereby reducing an amount of gas that is delivered to the second stage and increasing the speed of the first stage, and a clutch configured to allow the first stage to rotate at a faster speed than the second stage, wherein the clutch is configured to always prevent the second stage from rotating faster than the first stage.

* * * * *